(12) United States Patent
Fagiano et al.

(10) Patent No.: US 10,558,363 B2
(45) Date of Patent: Feb. 11, 2020

(54) HYBRID COMPRESSED MEDIA IN A TIERED STORAGE ENVIRONMENT

(71) Applicant: INTERNATIONAL BUSINESS MACHINES CORPORATION, Armonk, NY (US)

(72) Inventors: Christophe Fagiano, Mouans-Sartoux (FR); Itzhack Goldberg, Hadera (IL); Sandor Lengyel, Szodliget (HU); Neil Sondhi, Pilisborosjeno (HU); Daniel J. Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 15/232,047

(22) Filed: Aug. 9, 2016

(65) Prior Publication Data

US 2018/0046381 A1   Feb. 15, 2018

(51) Int. Cl.
*G06F 3/06*   (2006.01)
*G06F 12/0871*   (2016.01)

(52) U.S. Cl.
CPC .......... *G06F 3/0608* (2013.01); *G06F 3/067* (2013.01); *G06F 3/0611* (2013.01); *G06F 12/0871* (2013.01); *G06F 2212/1024* (2013.01); *G06F 2212/1044* (2013.01); *G06F 2212/154* (2013.01); *G06F 2212/263* (2013.01); *G06F 2212/401* (2013.01)

(58) Field of Classification Search
CPC ..... G06F 3/0608; G06F 3/0644; G06F 3/0641
See application file for complete search history.

(56) References Cited

U.S. PATENT DOCUMENTS

| | | | |
|---|---|---|---|
| 8,156,306 B1* | 4/2012 | Raizen | G06F 3/0608 707/813 |
| 8,478,731 B1* | 7/2013 | Throop | G06F 16/1744 707/693 |
| 8,769,049 B2 | 7/2014 | Murphy et al. | |
| 9,311,002 B1* | 4/2016 | Scott | G06F 3/0638 |
| 2011/0055471 A1 | 3/2011 | Thatcher et al. | |
| 2012/0102005 A1* | 4/2012 | Kamei | G06F 3/0608 707/693 |
| 2013/0297572 A1 | 11/2013 | Wilson et al. | |
| 2014/0143517 A1* | 5/2014 | Jin | G06F 3/0608 711/171 |
| 2014/0188819 A1 | 7/2014 | Bagal et al. | |
| 2015/0112951 A1 | 4/2015 | Narayanamurthy et al. | |
| 2015/0193170 A1 | 7/2015 | Sundaram et al. | |
| 2016/0371190 A1* | 12/2016 | Romanovskiy | G06F 3/067 |

* cited by examiner

*Primary Examiner* — Edward J Dudek, Jr.
*Assistant Examiner* — Andrew Russell
(74) *Attorney, Agent, or Firm* — Griffiths & Seaton PLLC (57) ABSTRACT

A hybrid compressed media is maintained by detecting hot data within a logical unit name (LUN), and compressing a remaining cold data within the LUN while keeping the hot data uncompressed. The uncompressed hot data and the compressed cold data are both stored within the LUN.

15 Claims, 5 Drawing Sheets

HYBRID COMPRESSED MEDIA IN A TIERED STORAGE ENVIRONMENT

BACKGROUND OF THE INVENTION

Field of the Invention

The present invention relates in general to computing systems, and more particularly, to various embodiments for managing data stored in a tiered data storage environment.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments for managing data stored in a tiered data storage environment, by a processor device, are provided. In one embodiment, a method comprises maintaining a hybrid compressed media by detecting hot data within a logical unit name (LUN), and compressing a remaining cold data within the LUN while keeping the hot data uncompressed; wherein the uncompressed hot data and the compressed cold data are both stored within the LUN.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Described embodiments, and illustrative figures of various embodiments for managing data stored in a tiered data storage environment are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Data tiering in large storage environments is a commonly used mechanism to distribute classifications of data over various storage devices based upon performance, operating costs, etc. For example, IBM Easy Tier® is a performance function used in storage environments that automatically and non-disruptively migrates frequently accessed data from magnetic media to solid-state drives (SSDs). In this way, the most frequently accessed data is stored on the fastest storage tier, and the overall performance is improved. It works in such a way that every volume is split into logical units called extents. Easy Tier® is based on algorithms that are developed by IBM® Research, which evaluates the access frequency of each extent. Each extent is rated according to the number of I/Os going to that extent. Extents with a high rating, receiving the most I/Os, are marked as "hot" extents and become candidates for migration to SSDs in the same storage pool. Periodically, but no greater than 24 hours, a migration plan is created according to the "heat" of the extents and the data is migrated to the SSD MDisk (managed disk). When the SSD becomes full, and there is a hotter extent to move onto the SSD, the "cooled" extents are migrated back to the lower-tiered MDisk (managed disk). These automated tiering mechanisms may apply to a wide variety of storage architectures, such as a traditional storage area network (SAN), and traditional or erasure coded object storage architectures.

An example of stored hot data and stored cold data may be found in financial data (e.g. credit card receipts), where after a certain period of time (e.g. 45 days) the access of this data plummets. Thus, the younger, more frequently accessed data is classified as hot data and the data older than the certain period of time (and exhibiting far fewer accesses) is classified as cold data.

In today's technology, it is generally recognized that a large portion (e.g. 80%) of the data stored in these types of systems is cold data, with a smaller portion (e.g. 20%) being hot data. A common technique to deal with such a large amount of stored cold data is to compress the data. Compressing the cold data is economically more efficient, as the cold data is accessed infrequently, and comprises much more of the data to be stored than hot data.

However, by using the compression mechanisms, hot data suffers great performance penalties. Therefore, currently, reducing the storage footprint also implies a performance impact on hot data. For this reason, storage systems often use two logical unit names (LUNs) for given data: one compressed LUN and one uncompressed LUN. Yet, this too is inefficient as separate, multiple LUNs must be used for compressed and uncompressed storage.

Accordingly, the present invention contemplates novel functionality for the storage of hot and cold data in tiered storage environments. These mechanisms include storing both hot, uncompressed data as well as cold, compressed data within the same LUN, as will be further described.

The mechanisms illustrated below may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Figure 1:
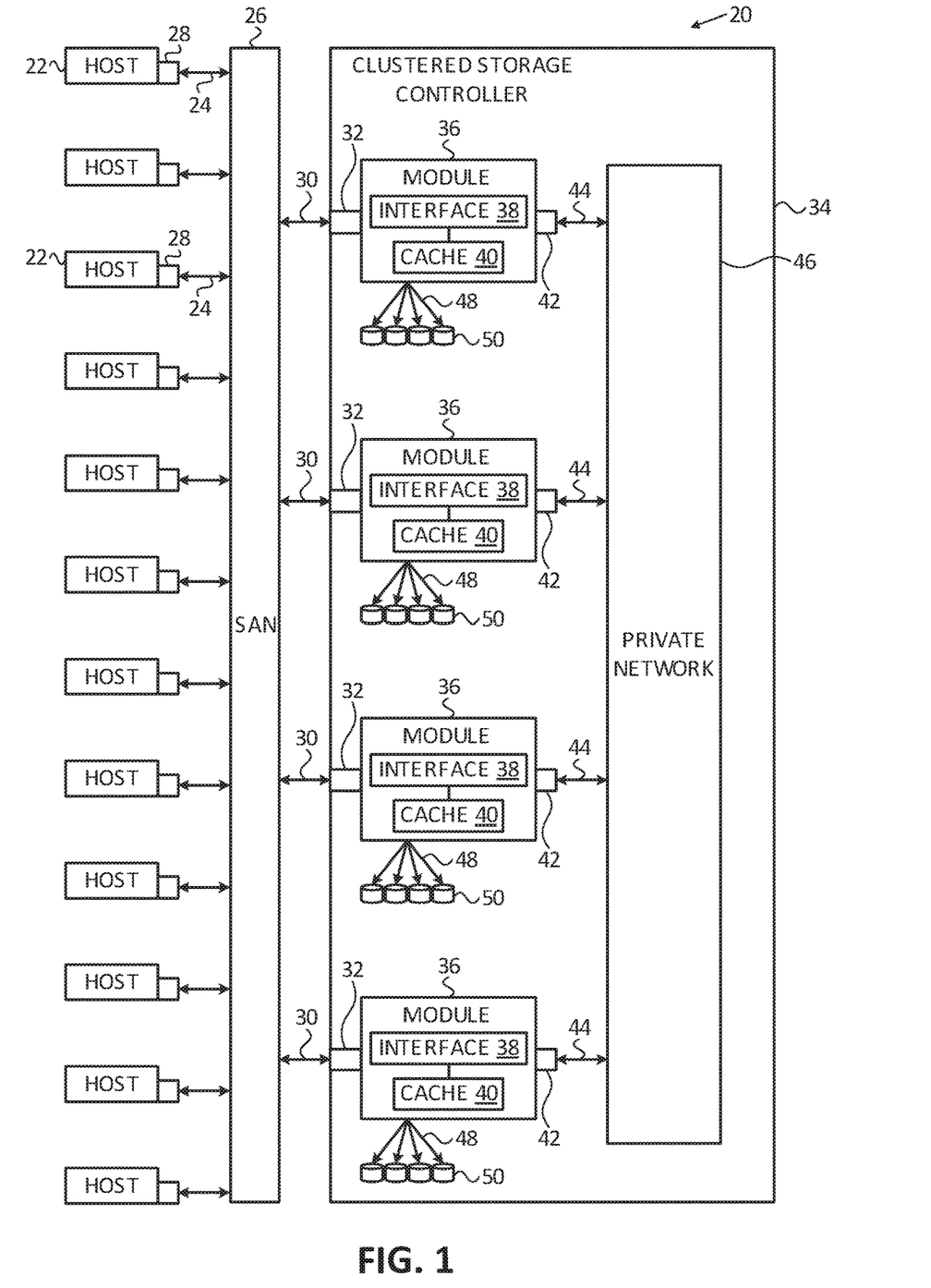
FIG. 1 illustrates a block diagram of a computer storage environment in which aspects of the present invention may be realized.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among storage modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
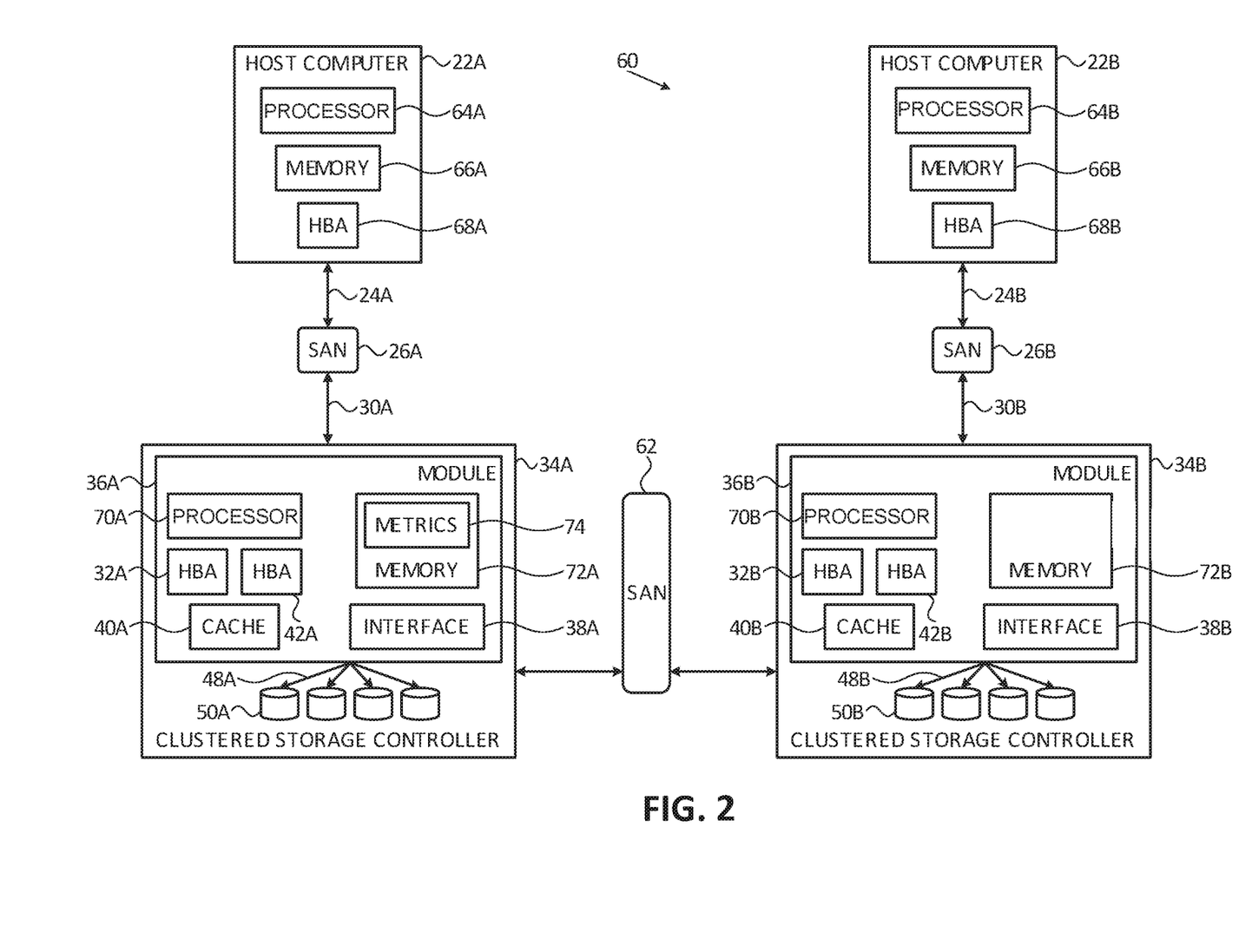
FIG. 2 illustrates a block diagram of a hardware structure of a data storage system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2, storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
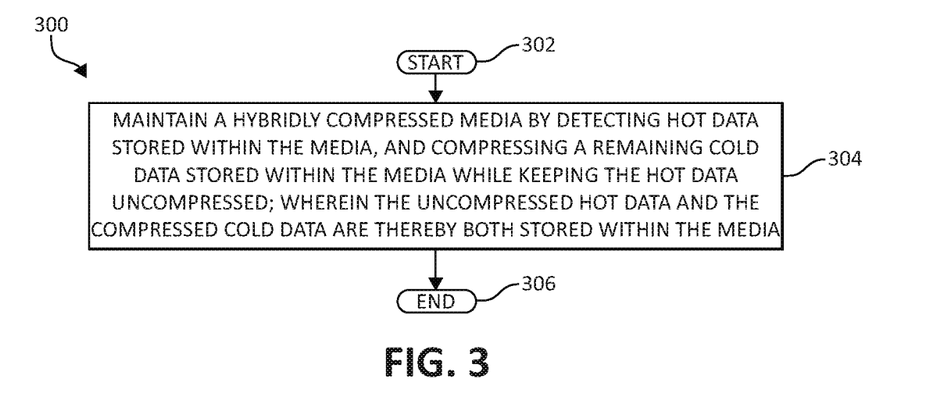
FIG. 3 illustrates a flowchart of a method for managing data stored in a tiered data storage environment, in accordance with aspects of the present invention.

Continuing, FIG. 3 illustrates a method 300 for managing data stored in a tiered data storage environment, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Beginning (step 302), a hybrid compressed media is maintained by detecting hot data within a logical unit name (LUN), and compressing a remaining cold data within the LUN while keeping the hot data uncompressed; wherein the uncompressed hot data and the compressed cold data are both stored within the LUN (step 304). The method ends (step 306).

As previously discussed, in any storage environment, a user needs to reserve at least two LUNs: one for compressed data and one for uncompressed data. The functionality of the present invention negates this requirement by storing both compressed and uncompressed data within the same LUN. The uncompressed section is reserved for data that the storage system has determined to be hot data, meaning that its frequency of access, change rate, or other metrics have surpassed a predetermined threshold. The uncompressed section may occupy a predetermined portion size of the overall size of the LUN. The remaining data is then classified as cold data, which is stored compressed. In some embodiments, the cold data may undergo a deduplication operation prior to the application of compression on the data, as will be further discussed.

Figure 4:
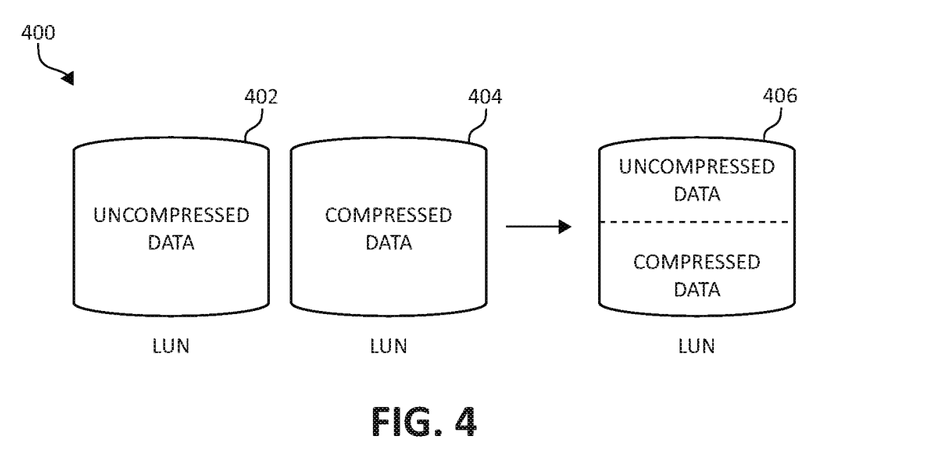
FIG. 4 illustrates a block diagram representing a logical unit name (LUN) in a data storage system, in accordance with aspects of the present invention.

FIG. 4 illustrates a block diagram 400 representing the aforementioned functionality on a given LUN or set of LUNs. As discussed, as is the state of the art now, two LUNs are generally reserved for given data in any storage environment: an uncompressed LUN 402 in which data stored therein is left uncompressed, and a compressed LUN 404 in which data stored therein is compressed. Assuming the 80% cold data and 20% hot data metric, in the compressed LUN 404, the size (using a compression ratio of 5:1) for the uncompressed data should equal a total data size divided by five (T=total data/5). The uncompressed LUN 402 should be the size of twenty percent (20%) of the LUN data.

When the data of only one LUN is hybridly compressed under the functionality of the present invention in LUN 406, only forty percent (40%) of the total amount of data is needed: twenty percent (20%) reserved for fully compressed data, having a compression ratio of 5:1, (cold data) and twenty percent (20%) reserved for uncompressed data (hot data). This results in a sixty percent (60%) storage savings with no impact on performance.

Figure 5:
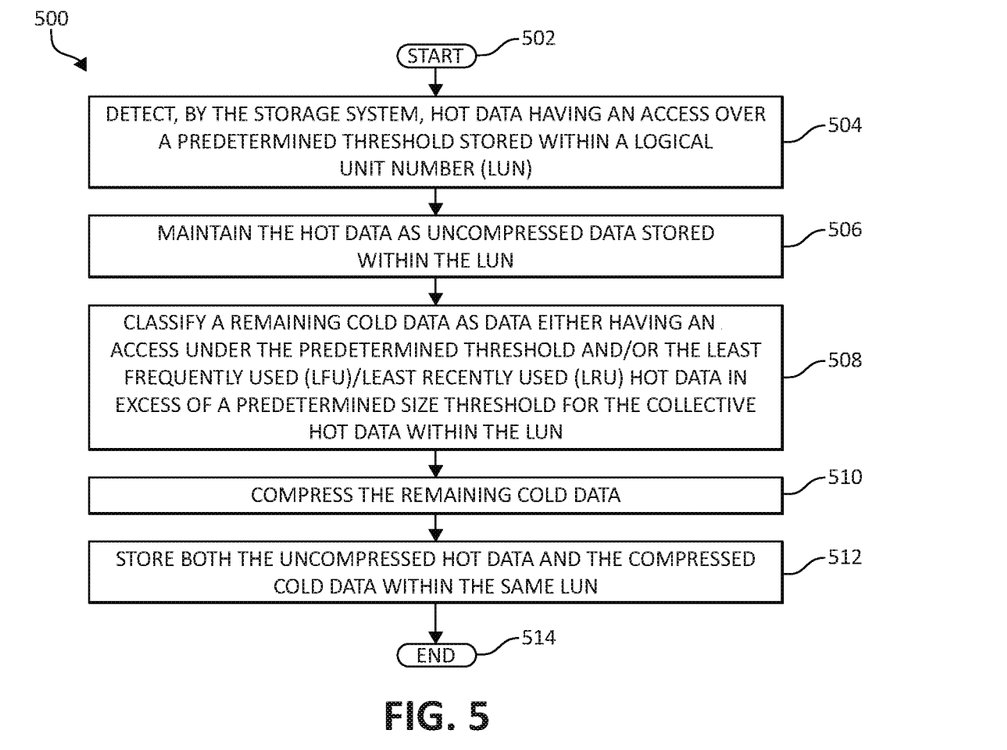
FIG. 5 illustrates an additional flowchart of a method for managing data stored in a tiered data storage environment, in accordance with aspects of the present invention.

Advancing, FIG. 5 illustrates a method 500 for managing data stored in a tiered data storage environment, in accordance with one embodiment of the present invention. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s)

implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Beginning (step 502), the storage system detects hot data stored within a logical unit number (LUN) (step 504). The data may be classified as hot by determining that the data has an input/output (I/O) access, a change rate, or other metric over a predetermined threshold. The hot data is maintained and stored as uncompressed data within the LUN (step 506). Remaining data may be classified as cold by which the data has an I/O access, change rate, or other metric under the predetermined threshold. Additionally, or alternatively, the cold data may be determined to be the least frequently used (LFU) and/or least recently used (LRU) of the hot data when the collective hot data reaches an excess of a predetermined size threshold within the LUN (step 508). In other words, upon reaching or exceeding a certain sizing bound within the LUN for the collective hot data, the LFU/LRU of the hot data is re-classified as cold data until the collective hot data has returned below the certain sizing bound. The remaining cold data is compressed (step 510). Both the uncompressed hot data and the compressed cold data are stored within the same LUN (step 512). The method ends (step 514).

Figure 6:
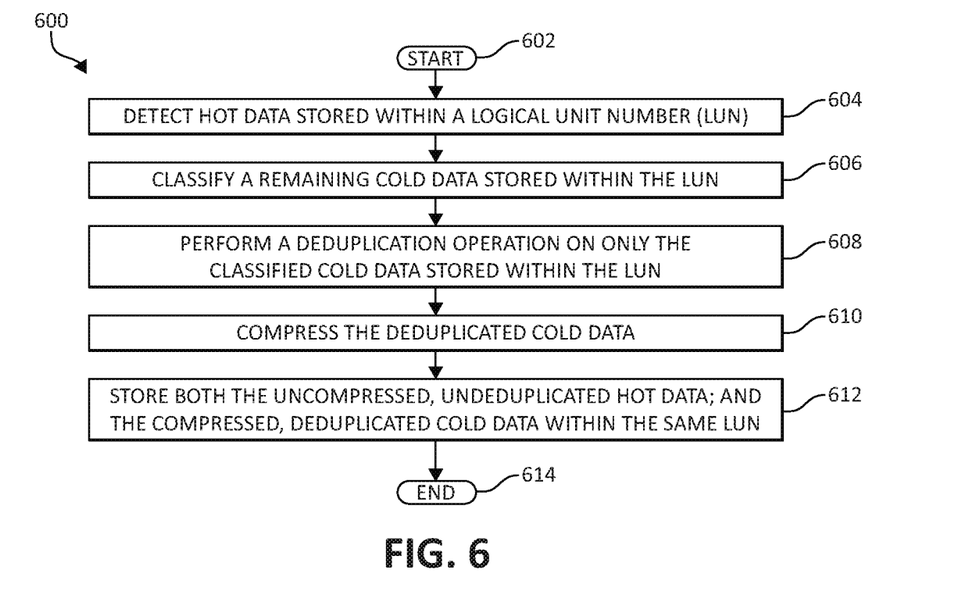
FIG. 6 illustrates an additional flowchart of a method for managing data stored in a tiered data storage environment, in accordance with aspects of the present invention.

FIG. 6 illustrates a method 600 for managing data stored in a tiered data storage environment, in accordance with an additional embodiment of the present invention. The method 600 may be performed in accordance with the present invention in any of the environments depicted in FIGS. 1-2, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

The method 600 begins (step 602), by detecting hot data stored within the LUN (step 604). A remaining stored cold data is then classified by the metrics associated in FIG. 5 (step 606). A deduplication operation is performed on only the classified cold data stored within the LUN (step 608), and upon deduplicating the cold data, the cold data is then compressed (step 610). Both the uncompressed, undeduplicated hot data; and the compressed, deduplicated cold data are then stored within the same LUN (step 612). The method ends (step 614).

In some embodiments, multiple classifications of storage for a given LUN may be provided, where a storage administrator may allocate data to a particular LUN classification based upon performance expectations, storage availability, or other characteristics. Some examples include LUNs having: 1) neither compressed nor deduplicated data (hottest data); 2) compressed but not deduplicated data; 3) deduplicated and not compressed data; and 4) compressed and deduplicated data (coldest data).

Figure 7:
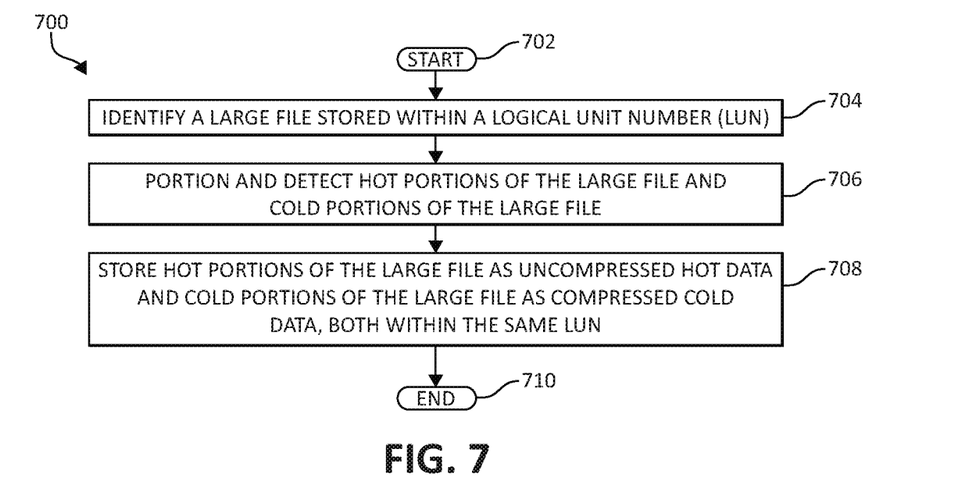
FIG. 7 illustrates still an additional flowchart of a method for managing data stored in a tiered data storage environment, in accordance with aspects of the present invention.

Concluding, FIG. 7 illustrates a method 700 for managing data stored in a tiered data storage environment, in accordance with yet an additional embodiment of the present invention. The method 600 may be performed in accordance with the present invention in any of the environments depicted in FIGS. 1-2, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

The method 700 begins (step 702), a large file (over a predetermined size, or other metric) is identified which is stored within a given LUN (step 704). The large file is then portioned in which it is detected the large file includes hot portions and cold portions within the same file (step 706). The determined hot portions of the large file are stored as uncompressed data while the determined cold portions of the large file are stored as compressed data, where both the uncompressed hot portions of the large file and the compressed cold portions of the large file are stored in the same LUN (step 708). The method ends (step 710).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowchart and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data stored in a tiered data storage environment, by a processor device, comprising:

maintaining a hybrid compressed media by detecting existing hot data stored within a logical unit name (LUN) of a mass storage device within the tiered data storage environment, and compressing a remaining existing cold data stored within the LUN while keeping the hot data uncompressed; wherein the uncompressed hot data and the compressed cold data are both stored within the LUN, the LUN reserved by a user of the tiered data storage environment;

identifying an existing file within the LUN having an existing file size over a predetermined threshold;

determining the existing file includes both portions of the hot data and portions of the cold data;

prior to performing the compressing, splitting the existing file into a hot data set comprising the portions of the hot data and a cold data set comprising the portions of the cold data;

compressing the cold data set of the existing file such that the portions of hot data are stored as uncompressed within the LUN and the portions of cold data are stored as compressed within the LUN; and performing a deduplication operation on only the cold data stored within the LUN, the deduplication operation performed prior to compressing the cold data.

2. The method of claim 1, wherein the hot data comprises data determined to have an access rate over a predetermined access threshold; and the cold data comprises previously hot data in excess of a predetermined size threshold for a collective hot data stored within the LUN.

3. The method of claim 2, wherein the previously hot data comprises one of a least frequently used (LFU) data and a least recently used (LRU) data of the hot data in excess of the predetermined size threshold for the collective hot data stored within the LUN.

4. The method of claim 2, further including setting the predetermined size threshold for the collective hot data stored within the LUN.

5. The method of claim 1, further including providing at least the following storage classifications for a given LUN, wherein data allocations may be determined by a storage administrator:
neither compressed nor deduplicated data;
compressed and not deduplicated data;
deduplicated and not compressed data; and
compressed and deduplicated data.

6. A system for managing data stored in a tiered data storage environment, the system comprising:
the tiered data storage environment; and
a processor device, wherein the processor device:
maintains a hybrid compressed media by detecting existing hot data stored within a logical unit name (LUN) of a mass storage device within the tiered data storage environment, and compressing a remaining existing cold data stored within the LUN while keeping the hot data uncompressed; wherein the uncompressed hot data and the compressed cold data are both stored within the LUN, the LUN reserved by a user of the tiered data storage environment;
identifies an existing file within the LUN having an existing file size over a predetermined threshold;
determines the existing file includes both portions of the hot data and portions of the cold data;
prior to performing the compressing, splits the existing file into a hot data set comprising the portions of the hot data and a cold data set comprising the portions of the cold data;
compresses the cold data set of the existing file such that the portions of hot data are stored as uncompressed within the LUN and the portions of cold data are stored as compressed within the LUN; and
performs a deduplication operation on only the cold data stored within the LUN, the deduplication operation performed prior to compressing the cold data.

7. The system of claim 6, wherein the hot data comprises data determined to have an access rate over a predetermined access threshold; and
the cold data comprises previously hot data in excess of a predetermined size threshold for a collective hot data stored within the LUN.

8. The system of claim 7, wherein the previously hot data comprises one of a least frequently used (LFU) data and a least recently used (LRU) data of the hot data in excess of the predetermined size threshold for the collective hot data stored within the LUN.

9. The system of claim 7, wherein the processor device sets the predetermined size threshold for the collective hot data stored within the LUN.

10. The system of claim 6, wherein the processor device provides at least the following storage classifications for a given LUN, wherein data allocations may be determined by a storage administrator:
neither compressed nor deduplicated data;
compressed and not deduplicated data;
deduplicated and not compressed data; and
compressed and deduplicated data.

11. A computer program product for managing data stored in a tiered data storage environment, by a processor device, the computer program product embodied on a non-transitory computer-readable storage medium having computer-readable program code portions stored therein, the computer-readable program code portions comprising:
an executable portion that maintains a hybrid compressed media by detecting existing hot data stored within a logical unit name (LUN) of a mass storage device within the tiered data storage environment, and compressing a remaining existing cold data stored within the LUN while keeping the hot data uncompressed; wherein the uncompressed hot data and the compressed cold data are both stored within the LUN, the LUN reserved by a user of the tiered data storage environment;
an executable portion that identifying an existing file within the LUN having an existing file size over a predetermined threshold;
an executable portion that determines the existing file includes both portions of the hot data and portions of the cold data;
an executable portion that, prior to performing the compressing, splits the existing file into a hot data set comprising the portions of the hot data and a cold data set comprising the portions of the cold data;
an executable portion that compresses the cold data set of the existing file such that the portions of hot data are stored as uncompressed within the LUN and the portions of cold data are stored as compressed within the LUN; and
an executable portion that performs a deduplication operation on only the cold data stored within the LUN, the deduplication operation performed prior to compressing the cold data.

12. The computer program product of claim 11, wherein the hot data comprises data determined to have an access rate over a predetermined access threshold; and
the cold data comprises previously hot data in excess of a predetermined size threshold for a collective hot data stored within the LUN.

13. The computer program product of claim 12, wherein the previously hot data comprises one of a least frequently used (LFU) data and a least recently used (LRU) data of the hot data in excess of the predetermined size threshold for the collective hot data stored within the LUN.

14. The computer program product of claim 12, further including an executable portion that sets the predetermined size threshold for the collective hot data stored within the LUN.

15. The computer program product of claim 11, further including an executable portion that provides at least the following storage classifications for a given LUN, wherein data allocations may be determined by a storage administrator:
neither compressed nor deduplicated data;
compressed and not deduplicated data;
deduplicated and not compressed data; and
compressed and deduplicated data.

* * * * *